(12) United States Patent
Peng et al.

(10) Patent No.: US 9,001,298 B1
(45) Date of Patent: Apr. 7, 2015

(54) PIXEL STRUCTURE, DISPLAY PANEL AND MANUFACTURING METHOD OF PIXEL STRUCTURE

(71) Applicant: Au Optronics Corporation, Hsinchu (TW)

(72) Inventors: Yan-Yu Peng, New Taipei (TW); Hsing-Lung Lee, New Taipei (TW)

(73) Assignee: Au Optronics Corporation, Hsinchu (TW)

( * ) Notice: Subject to any disclaimer, the term of this patent is extended or adjusted under 35 U.S.C. 154(b) by 11 days.

(21) Appl. No.: 14/077,191

(22) Filed: Nov. 11, 2013

(30) Foreign Application Priority Data

Sep. 16, 2013 (TW) ............................ 102133501 A

(51) Int. Cl.
 *G02F 1/1343* (2006.01)
 *G02F 1/1333* (2006.01)

(52) U.S. Cl.
 CPC .... *G02F 1/133345* (2013.01); *G02F 1/134336* (2013.01)

(58) Field of Classification Search
 USPC ................................................. 349/141, 145
 See application file for complete search history.

(56) References Cited

U.S. PATENT DOCUMENTS 7,839,462 B2 11/2010 Lin
2011/0310341 A1* 12/2011 Kim et al. .................... 349/140

FOREIGN PATENT DOCUMENTS

CN 102629612 8/2012
TW 201327002 7/2013

* cited by examiner

*Primary Examiner* — Lucy Chien
(74) *Attorney, Agent, or Firm* — Jiang Chyun IP Office

(57) ABSTRACT

A pixel structure includes a scan line, a first insulation layer, a data line, a pixel electrode, a second insulation layer, and a common electrode. The scan line and the first insulation layer are disposed on a first substrate and the first insulation layer covers the scan line. The data line and the pixel electrode are disposed on the first insulation layer. The second insulation layer covers the data line and the pixel electrode and has a first opening located between the data line and the pixel electrode. The common electrode is disposed on the second insulation layer and has slits exposing a portion of the pixel electrode. The common electrode covers the data line and has a first extending portion filled in the first opening such that the first extending portion of the common electrode is located between the data line and the pixel electrode.

15 Claims, 9 Drawing Sheets

PIXEL STRUCTURE, DISPLAY PANEL AND MANUFACTURING METHOD OF PIXEL STRUCTURE

CROSS-REFERENCE TO RELATED APPLICATION

This application claims the priority benefit of Taiwan application serial no. 102133501, filed on Sep. 16, 2013. The entirety of the above-mentioned patent application is hereby incorporated by reference herein and made a part of this specification.

BACKGROUND OF THE INVENTION

1. Field of the Invention

The invention relates to a pixel structure, a manufacturing method thereof, and a display panel, and more particularly, to a pixel structure having low parasitic capacitance, a manufacturing method thereof, and a display panel including the pixel structure.

2. Description of Related Art

Generally, liquid crystal molecules in a liquid crystal display (LCD) panel can be driven through a vertical electric field or a lateral electric field. Examples of a display medium driven by the vertical electric field include a twisted nematic (TN) LCD panel and a vertical alignment (VA) LCD panel. Examples of a display medium driven by the lateral electric field include an in-plane switching (IPS) LCD panel and a fringe field switching (FFS) LCD panel.

Using the FFS-LCD panel as an example, in one of the current manufacturing methods of a pixel structure, the drain electrode of the active device and the pixel electrode can be fabricated on the same level and be electrically connected to each other. For instance, the drain electrode can directly cover a portion of the pixel electrode or the pixel electrode can directly cover a portion of the drain electrode to make the two be electrically connected to each other. Generally, the direction of extension of the data line is parallel to the long side of the pixel electrode. As a result, when the data line and the drain electrode are fabricated at the same time and are located on the same level as the pixel electrode, parasitic capacitance between the data line and the pixel electrode causes considerable cross talk phenomenon. For instance, during operation of the pixel structure, a signal on the data line may interfere with the electric potential of the pixel electrode such that the electric potential of the pixel electrode is unstable, thereby affecting the driving state of the liquid crystal molecules and causing poor quality of the display image.

SUMMARY OF THE INVENTION

The invention provides a pixel structure and a manufacturing method thereof. In the pixel structure, a portion of a common electrode is disposed between a data line and a pixel electrode to be used as an electrical shielding layer. As a result, cross talk phenomenon of the pixel structure can be reduced. The invention further provides a display panel. The display panel includes said pixel structure and therefore has good display quality.

The pixel structure of the invention is disposed on a first substrate. The pixel structure includes a scan line, a first insulation layer, a data line, a pixel electrode, a second insulation layer, and a common electrode. The scan line is disposed on the first substrate. The first insulation layer is disposed on the first substrate and covers the scan line. The data line is disposed on the first insulation layer. The pixel electrode is disposed on the first insulation layer, and the pixel electrode and the data line are separated by a distance. The second insulation layer covers the data line and the pixel electrode and has a first opening located between the data line and the pixel electrode. The common electrode is disposed on the second insulation layer and has a plurality of slits to expose a portion of the pixel electrode. In particular, the common electrode covers the data line and has a first extending portion filled in the first opening such that the first extending portion of the common electrode is located between the data line and the pixel electrode.

The manufacturing method of a pixel structure of the invention includes the following steps. First, a scan line is formed on a first substrate; a first insulation layer is formed on the first substrate, and the first insulation layer covers the scan line; a data line is formed on the first insulation layer; a pixel electrode is formed on the first insulation layer, and the pixel electrode and the data line are separated by a distance; a second insulation layer is formed on the first substrate, the second insulation layer covers the data line and the pixel electrode, and the second insulation layer has a first opening located between the data line and the pixel electrode; a common electrode is formed on the second insulation layer, the common electrode has a plurality of slits, and a portion of the common electrode covers the data line and fills the first opening such that a portion of the common electrode is between the data line and the pixel electrode.

The display panel of the invention includes a first substrate, a scan line, a first insulation layer, a data line, a pixel electrode, a second insulation layer, a common electrode, a second substrate, and a display medium layer. The scan line is disposed on the first substrate. The first insulation layer is disposed on the first substrate. The data line is disposed on the first insulation layer. The pixel electrode is disposed on the first insulation layer, and the pixel electrode and the data line are separated by a distance. The second insulation layer covers the data line and the pixel electrode and has a first opening located between the data line and the pixel electrode. The common electrode is disposed on the second insulation layer. The common electrode has a plurality of slits to expose a portion of the pixel electrode. In particular, the common electrode covers the data line and has a first extending portion filled in the first opening such that the first extending portion of the common electrode is located between data line and the pixel electrode. The second substrate is disposed opposite to the first substrate. The display medium layer is disposed between the first substrate and the second substrate.

Based on the above, in the pixel structure of the invention, a portion of a common electrode is disposed between a data line and a pixel electrode to be used as an electrical shielding layer between the data line and the pixel electrode. As a result, cross talk phenomenon between the data line and the pixel electrode is reduced. Accordingly, an LCD panel including the pixel structure can have good display quality.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
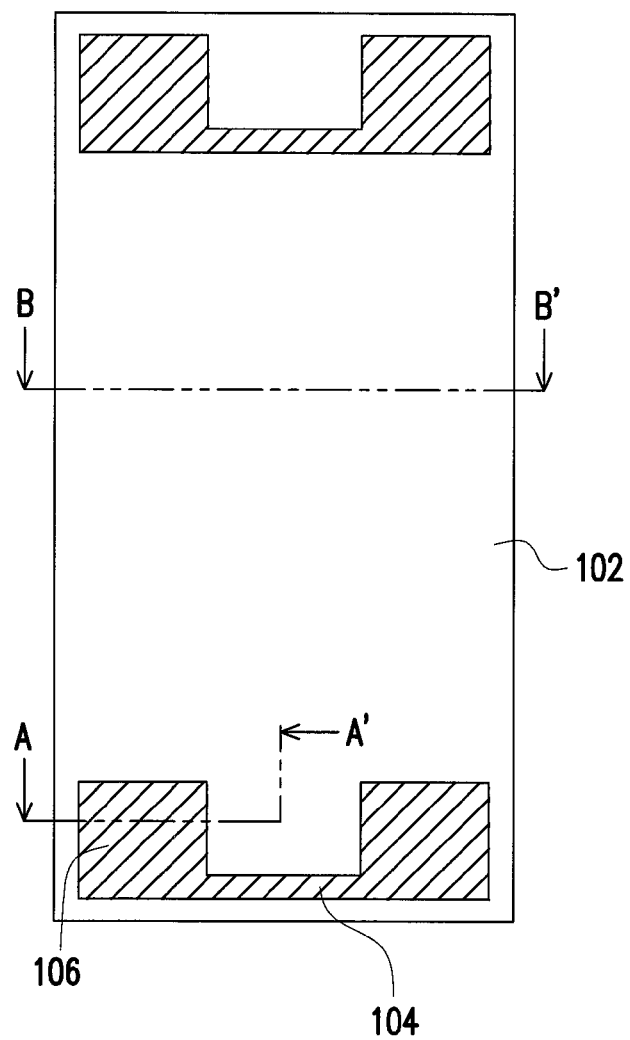
FIG. 1A to FIG. 1F are schematic top views of a manufacturing process of a pixel structure of an embodiment of the invention.
Figure 2A:
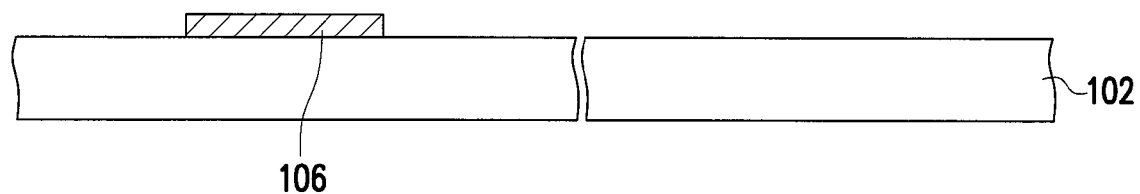
FIG. 2A to FIG. 2F are respectively cross-sectional views along cutting-plane line A-A' and cutting-plane line B-B' of FIG. 1A to FIG. 1F.

FIG. 1A to FIG. 1F are schematic top views of a manufacturing process of a pixel structure of an embodiment of the invention. FIG. 2A to FIG. 2F are respectively cross-sectional views along cutting-plane line A-A' and cutting-plane line B-B' of FIG. 1A to FIG. 1F. Referring to FIG. 1A and FIG. 2A, first, a scan line 104 is formed on a first substrate 102. Moreover, a gate electrode 106 can also be formed at the same time, and the scan line 104 is electrically connected to the gate electrode 106. The material of each of the scan line 104 and the gate electrode 106 includes an alloy, a metal material, metal nitride, metal oxide, metal nitrogen oxide, a transparent conductive material, other conductive materials, or a stacked layer of the materials.

Figure 1B:
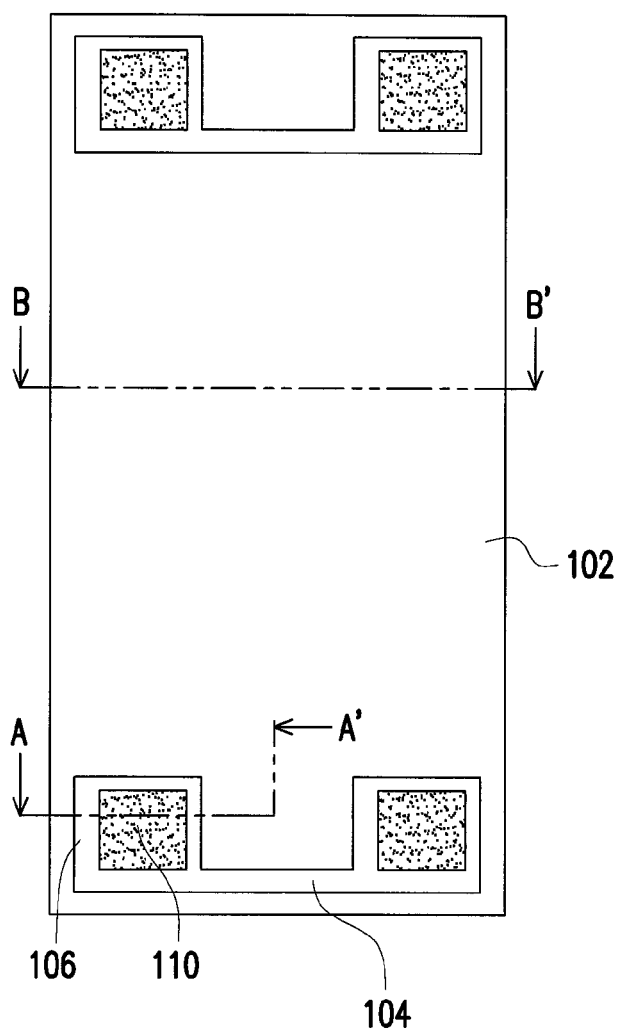
Figure 2B:
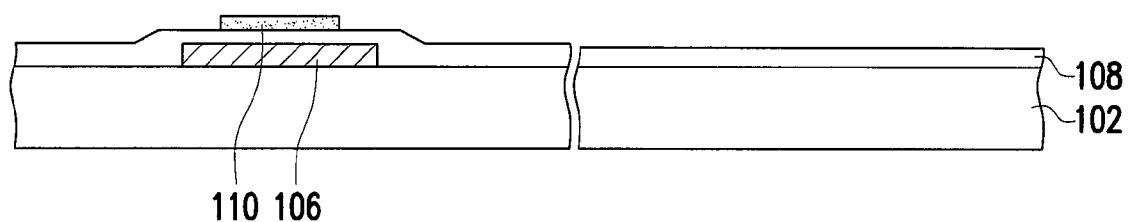

Referring to FIG. 1B and FIG. 2B, first, a first insulation layer 108 is formed on the first substrate 102. The first insulation layer 108 covers a portion of the first substrate 102 and the scan line 104. The material of the first insulation layer 108 includes an inorganic dielectric material (such as silicon oxide, silicon nitride, silicon oxynitride, or other suitable inorganic dielectric materials) or an organic dielectric material. Then, a channel layer 110 can optionally be formed on the first insulation layer 108, and the channel layer 110 is located above the gate electrode 106. The material of the channel layer 110 includes a semiconductor material such as amorphous silicon, polysilicon, microcrystalline silicon, indium gallium zinc oxide, aluminum gallium zinc oxide, but is not limited thereto.

Figure 1C:
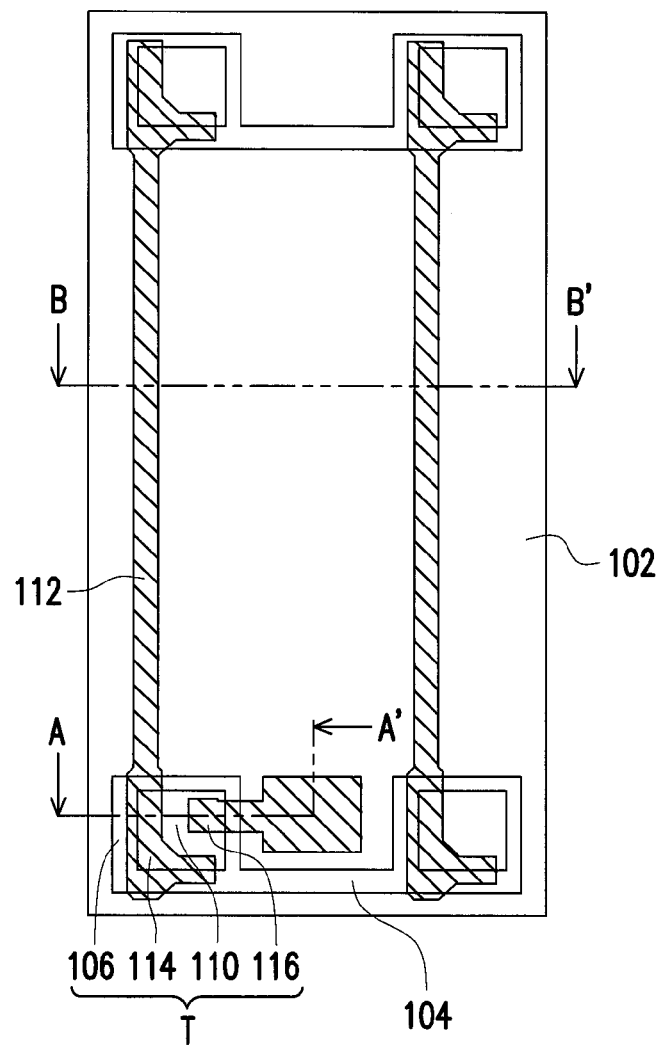
Figure 2C:
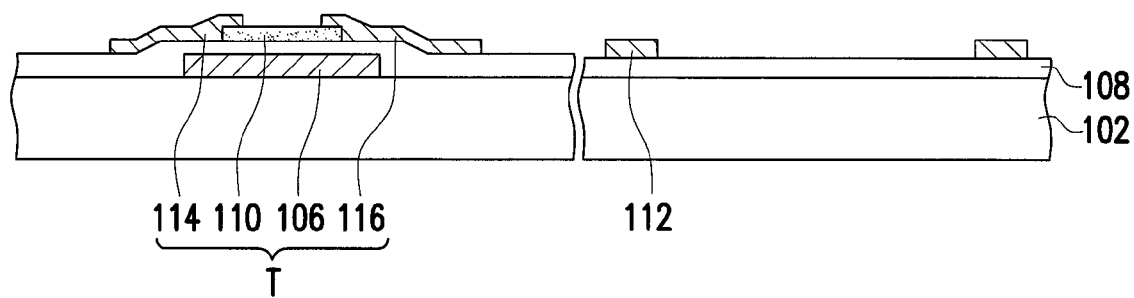

Referring to FIG. 1C and FIG. 2C, a data line 112 is formed on the first substrate 102. Moreover, a source electrode 114 and a drain electrode 116 can also be formed at the same time. The source electrode 114 and the drain electrode 116 are disposed on the first insulation layer 108. In the present embodiment, the source electrode 114 and the drain electrode 116 cover a partial region of the channel layer 110, the source electrode 114 and the drain electrode 116 are separated from each other, and the source electrode 114 is electrically connected to the data line 112. The material of each of the data line 112, the source electrode 114, and the drain electrode 116 includes an alloy, a metal material, metal nitride, metal oxide, metal nitrogen oxide, a transparent conductive material, other conductive materials, or a stacked layer of the materials. In the present embodiment, the gate electrode 106, the source electrode 114, the drain electrode 116, and the channel layer 110 can substantially form a thin film transistor to be used as an active device T. The active device T of the invention is only exemplified as the back channel etch (BCE) thin film transistor structure above, and is suitable for an i-stop thin film transistor structure having an island shape or a coplanar thin film transistor structure, but is not limited thereto. The detailed structure thereof is known to those having ordinary skill in the art and is not repeated herein.

Figure 1D:
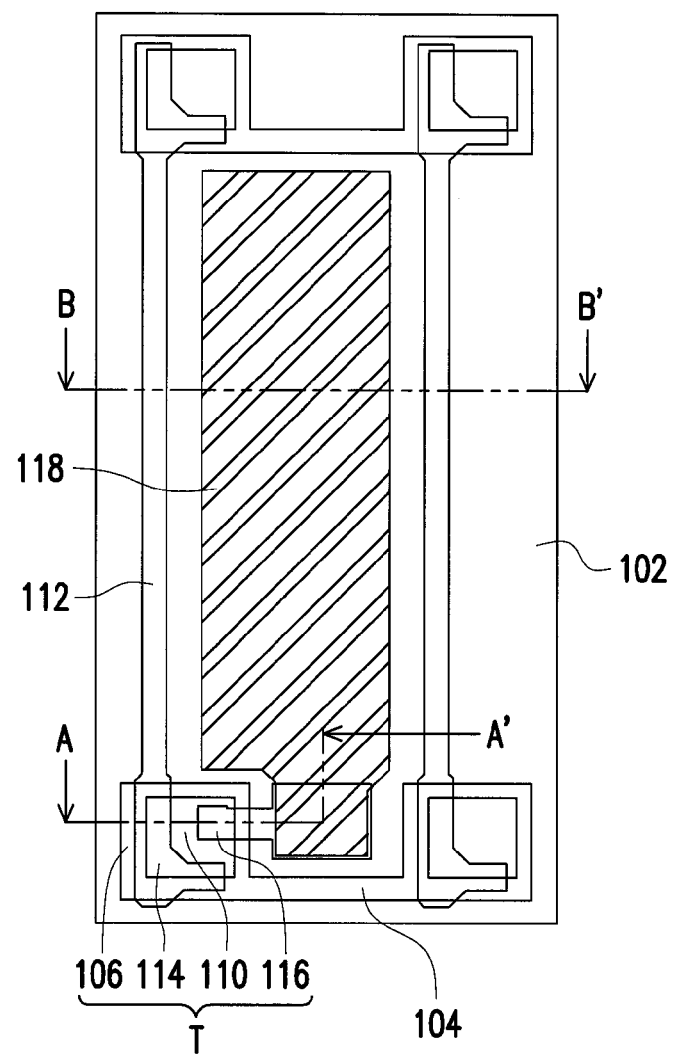
Figure 2D:
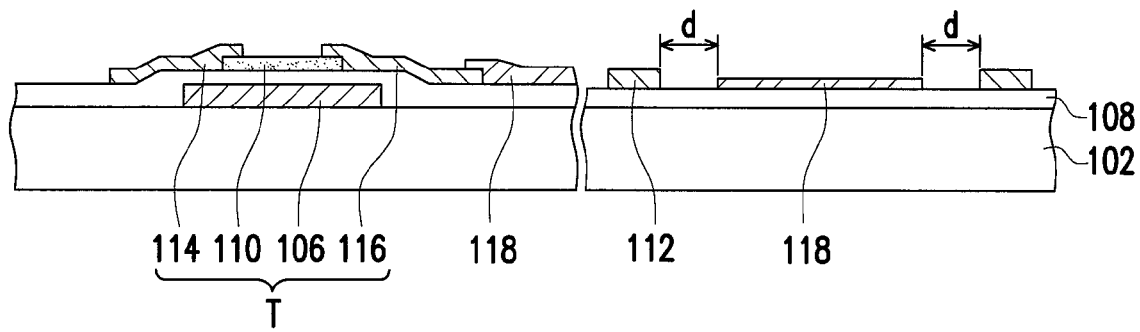

Referring to FIG. 1D and FIG. 2D, a pixel electrode 118 is formed on the first insulation layer 108, and the pixel electrode 118 can be formed from a transparent conductive material such as indium tin oxide (ITO), indium zinc oxide (IZO), aluminum zinc oxide (AZO), or other suitable conductive materials, but is not limited thereto. The pixel electrode 118 and the data line 112 can both be disposed on the first insulation layer 108, and therefore the pixel electrode 118 and the data line 112 are, for instance, coplanarly disposed and located on the same level. The pixel electrode 118 and the data line 112 are separated from each other by a distance d. The pixel electrode 118 is electrically connected to the drain electrode 116. Specifically, the pixel electrode 118 can cover a portion of the drain electrode 116 and be in contact with the drain electrode 116. The pixel electrode 118 and the data line 112 can be, for instance, made from different materials.

Figure 1E:
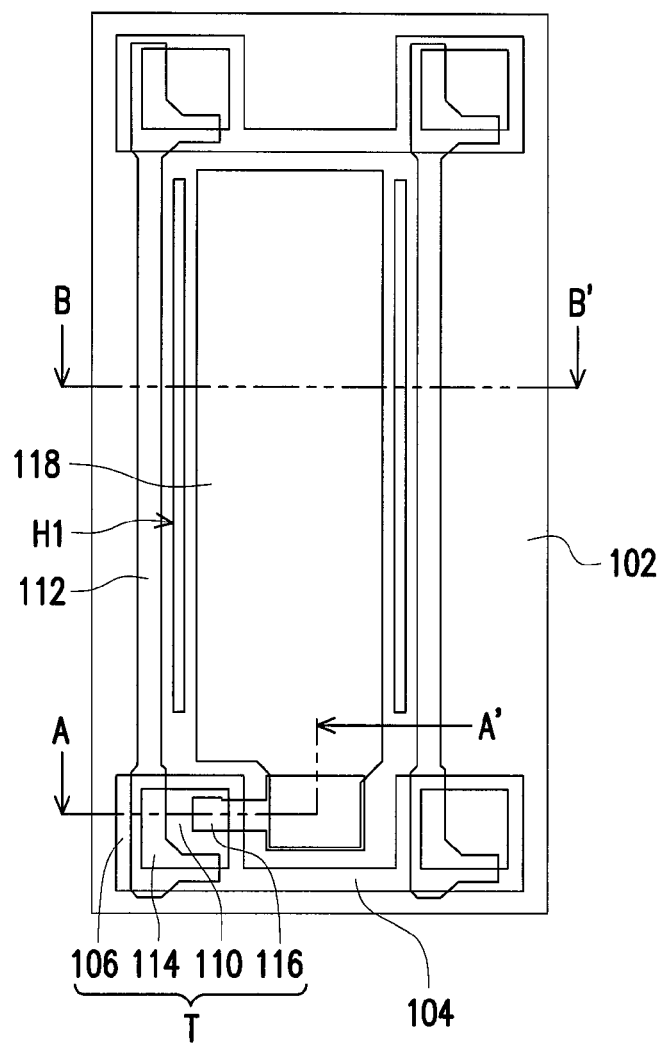
Figure 2E:
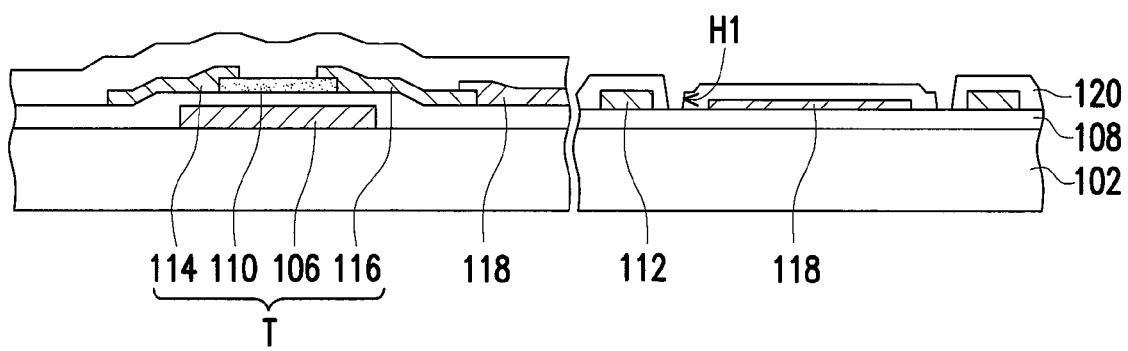

Referring to FIG. 1E and FIG. 2E, a second insulation layer 120 is formed on the first substrate 102. The second insulation layer 120 covers the active device T, the pixel electrode 118, the data line 112, and the first insulation layer 108. In the present embodiment, the second insulation layer 120 has a first opening H1. The first opening H1 is, for instance, an elongated opening, and is located between the data line 112 and the pixel electrode 118. The first opening H1 exposes a portion of the first insulation layer 108.

Figure 1F:
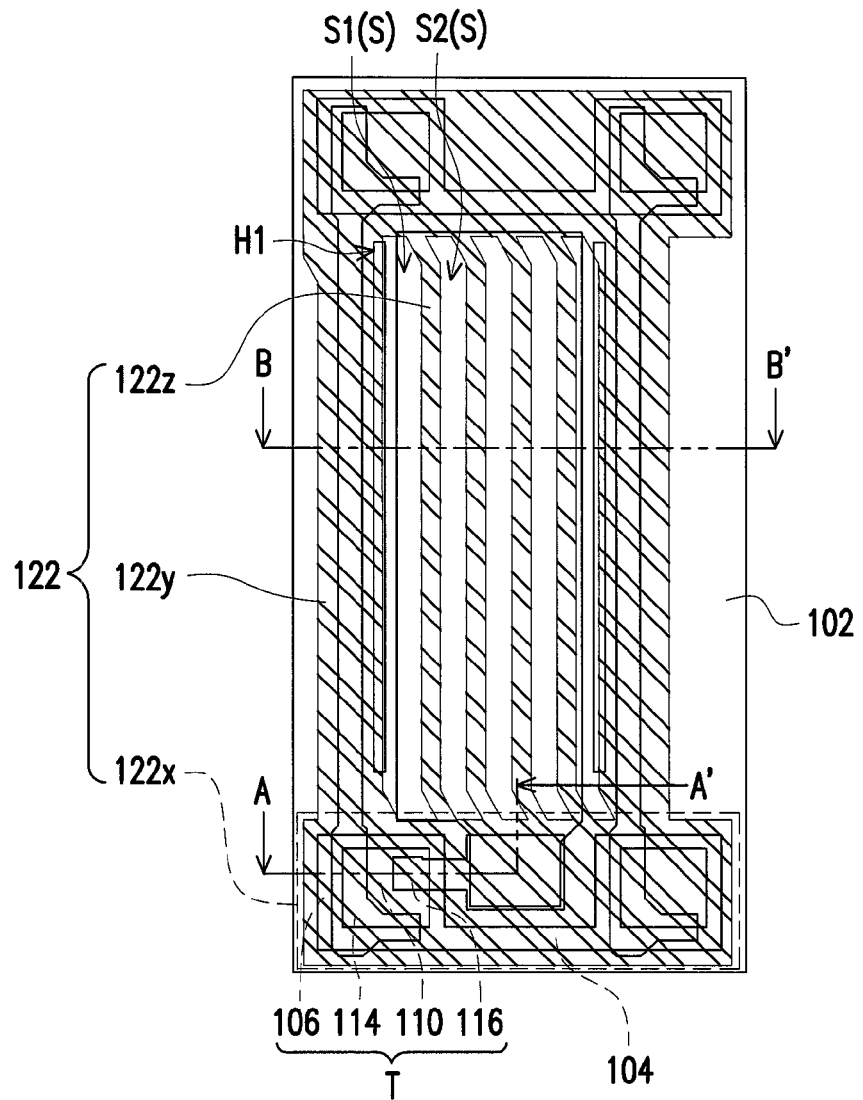
Figure 2F:
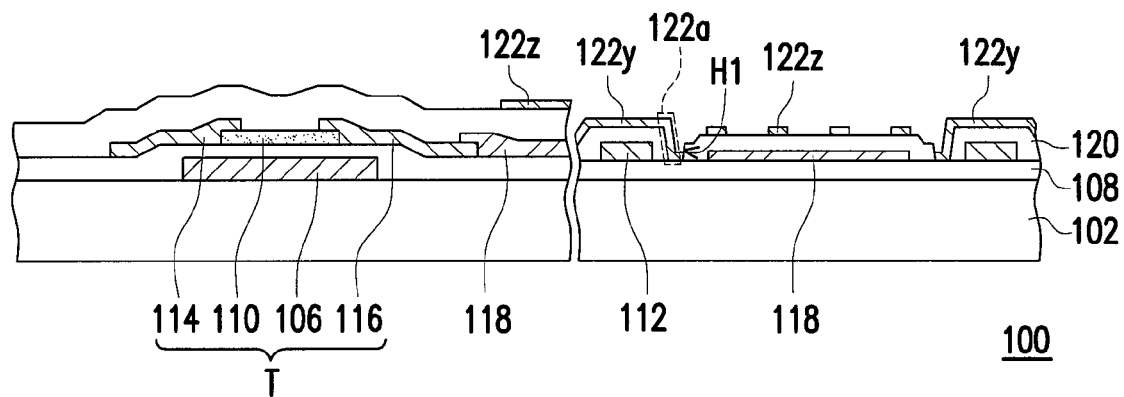

Referring to FIG. 1F and FIG. 2F, a common electrode 122 is formed on the second insulation layer 120. The common electrode 122 can be formed from a transparent conductive material such as indium tin oxide (ITO), indium zinc oxide (IZO), or aluminum zinc oxide (AZO), a stacked layer of a transparent conductive material and a metal conductive material, or other suitable conductive materials, but is not limited thereto. The common electrode 122 has a plurality of slits S exposing a portion of the pixel electrode 118. At this point, the manufacture of the pixel structure 100 is largely complete. In the present embodiment, the common electrode 122 covers the data line 112 and has a first extending portion 122a. The first extending portion 122a extends to the first opening H1 from above the data line 112. Accordingly, the first extending portion 122a is located in the first opening H1 and is in contact with the first insulation layer 108. In other words, the first extending portion 122a is, for instance, located between the data line 112 and the pixel electrode 118. As a result, the first extending portion 122a can be used as an electrical shielding layer between the data line 112 and the pixel electrode 118 to reduce the occurrence of cross talk phenomenon between the data line 112 and the pixel electrode 118, thereby allowing the pixel structure 100 to have good display quality. Moreover, the first extending portion 122a is manufactured with the common electrode 122. As a result, no additional processes are needed, and manufacturing costs can therefore be reduced.

From another perspective, the common electrode 122 includes a first portion 122x, a second portion 122y, and a plurality of third portions 122z. The first portion 122x covers the scan line 104. The second portion 122y covers the data line 112 and is further extended to fill the first opening H1. The third portions 122z are located above the pixel electrode 118. In the present embodiment, a slit S1 is located between the second portion 122y and the adjacent third portion 122z. A slip S2 is located between two adjacent third portions 122z. Specifically, an electric field passing through the slits S1 and S2 can be formed between the common electrode 122 and the pixel electrode 118, and the electric field can be used to drive a display medium such as a liquid crystal layer. The common electrode 122 and the pixel electrode 118 are both located on the first substrate 102. In particular, the common electrode 122 and the pixel electrode 118 are located on different levels, thereby forming a fringe field switching (FFS) pixel structure.

Generally, a plurality of pixel structures 100 arranged in an array can be disposed on the first substrate 102 to form a pixel array substrate. In the present embodiment, only an exemplary portion of the pixel structures 100 is illustrated. However, the invention is not limited thereto. Those having ordinary skill in the art should understand the structure of the pixel array substrate after referring to the description of the present embodiment.

Figure 3A:
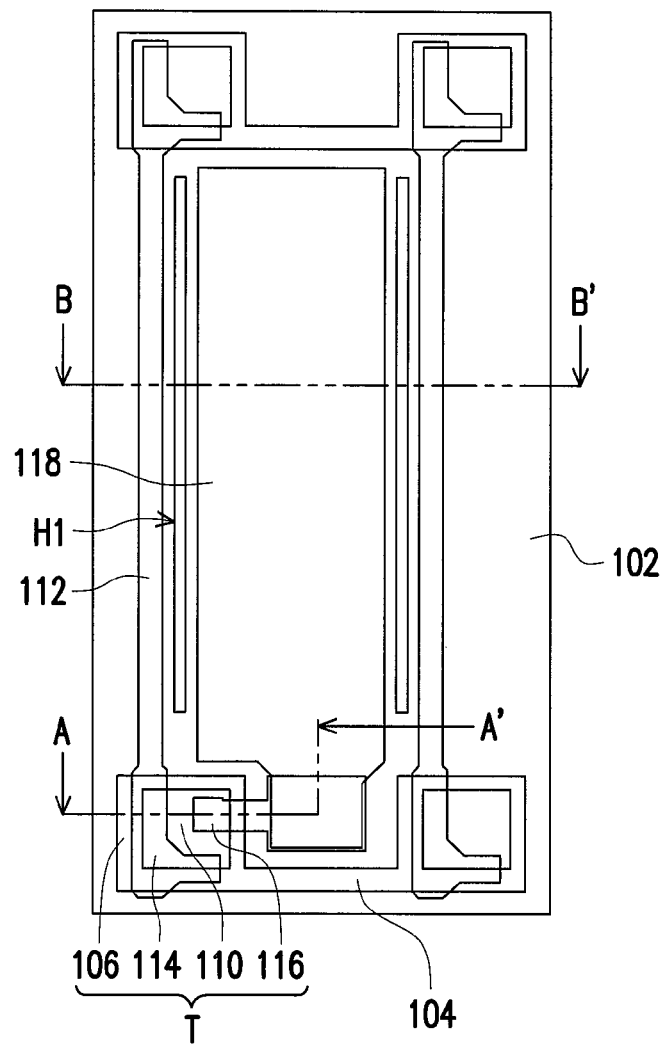
FIG. 3A to FIG. 3B are schematic top views of a manufacturing process of a pixel structure of another embodiment of the invention.
Figure 4A:
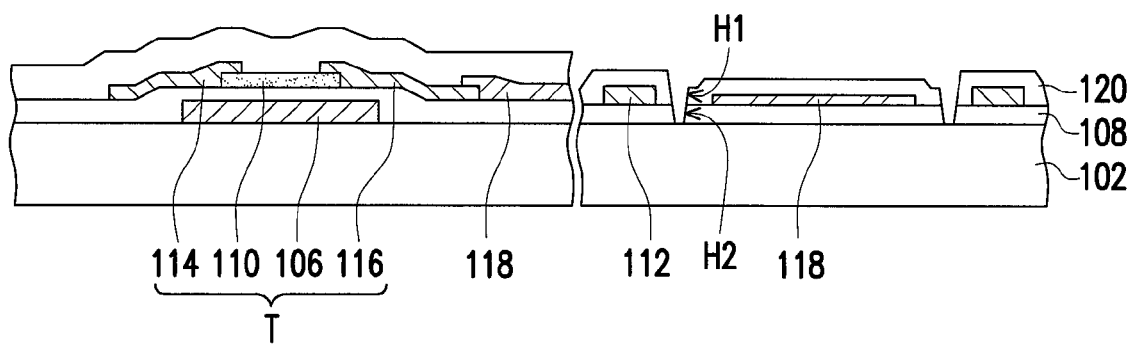
FIG. 4A to FIG. 4B are respectively cross-sectional views along cutting-plane line A-A' and cutting-plane line B-B' of FIG. 3A to FIG. 3B.
Figure 3B:
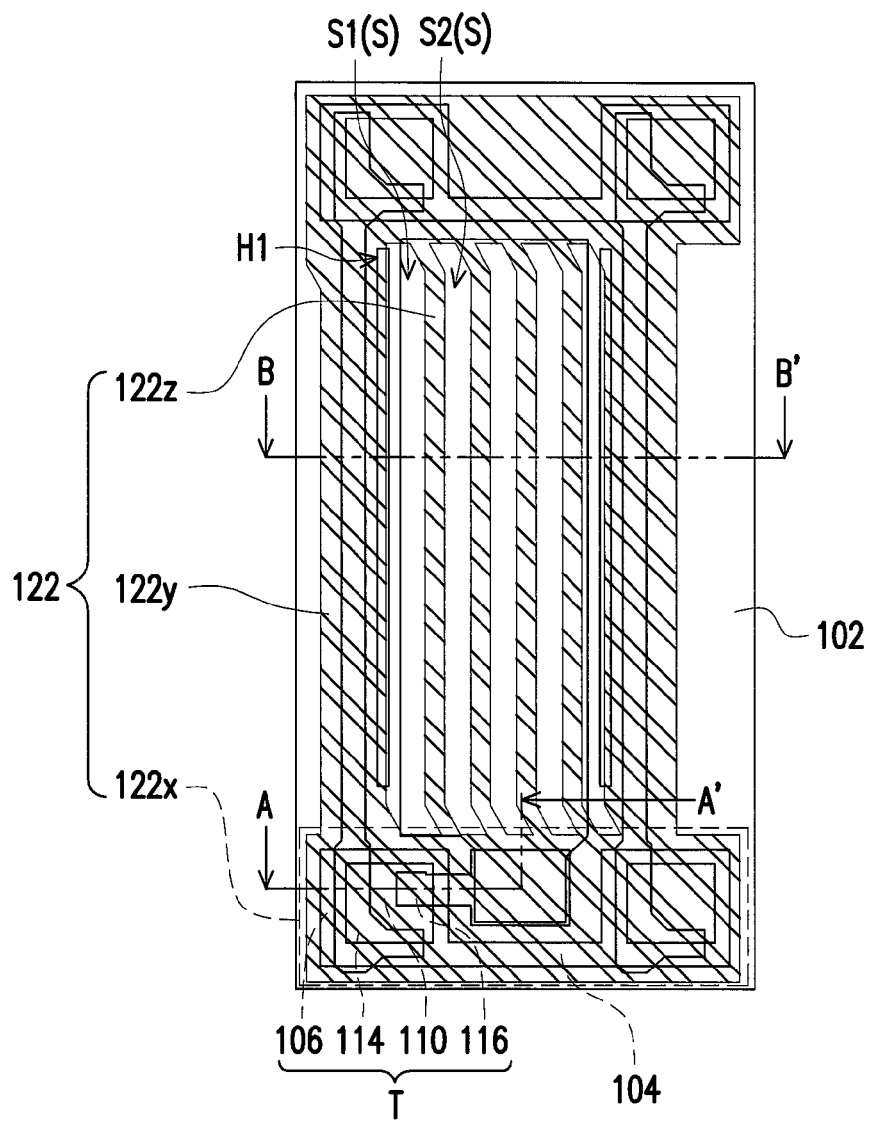
Figure 4B:
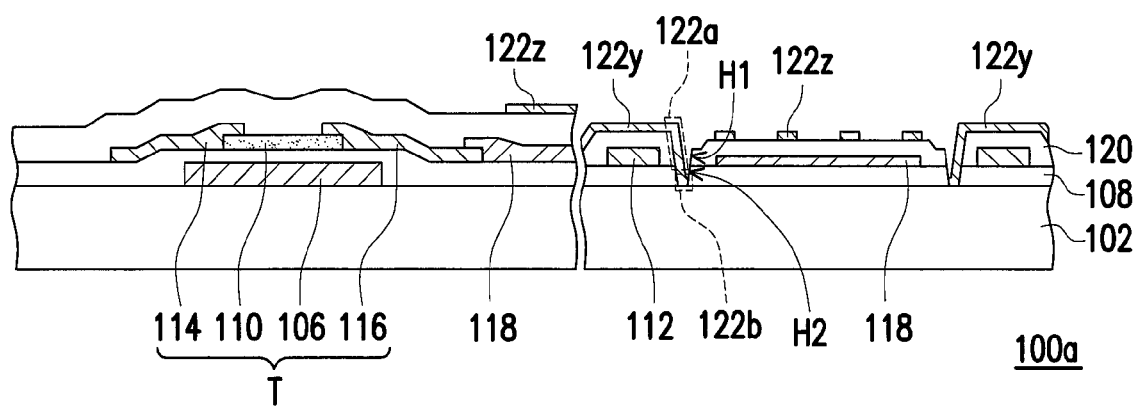

FIG. 3A to FIG. 3B are schematic top views of a manufacturing process of a pixel structure of another embodiment of the invention. FIG. 4A to FIG. 4B are respectively cross-sectional views along cutting-plane line A-A' and cutting-plane line B-B' of FIG. 3A to FIG. 3B. The pixel structure 100a of the present embodiment is manufactured, for instance, by first performing the steps of FIG. 1A to FIG. 1D. Then, referring to FIG. 3A and FIG. 4A, first, a second insulation layer 120 is formed on the first substrate 102. The second insulation layer 120 covers the active device T, the pixel electrode 118, the data line 112, and the first insulation layer 108. In the present embodiment, the second insulation layer 120 has a first opening H1, and the first insulation layer 108 further has a second opening H2. In particular, the first opening H1 is connected to the second opening H2 such that a portion of the first substrate 102 is exposed. The first opening H1 and the second opening H2 are, for instance, elongated openings, and are located between the data line 112 and the pixel electrode 118.

Referring to FIG. 3B and FIG. 4B, a common electrode 122 is formed on the second insulation layer 120. The common electrode 122 has a plurality of slits S exposing a portion of the pixel electrode 118. At this point, the manufacture of the pixel structure 100a is largely complete. In the present embodiment, the common electrode 122 covers the data line 112 and has a first extending portion 122a. The first extending portion 122a extends to the first opening H1 from above the data line 112. In addition, the common electrode 122 further has a second extending portion 122b. The second extending portion 122b is located in the second opening H2 and is connected to the first extending portion 122a. In particular, the second extending portion 122b is in contact with the first substrate 102. In the present embodiment, the first extending portion 122a and the second extending portion 122b are, for instance, located between the data line 112 and the pixel electrode 118. As a result, the first extending portion 122a and the second extending portion 122b can be used as electrical shielding layers between the data line 112 and the pixel electrode 118 to reduce the occurrence of cross talk phenomenon between the data line 112 and the pixel electrode 118, thereby allowing the pixel structure 100a to have good display quality. Moreover, similarly to the embodiment of each of FIG. 1D and FIG. 2D, the common electrode 122 of the present embodiment includes a first portion 122x, a second portion 122y, and a plurality of third portions 122z. Details of the particular structure are as described in the previous embodiments are not repeated herein. The first extending portion 122a and the second extending portion 122b are fabricated with the common electrode 122. As a result, no additional processes are needed, and manufacturing costs can therefore be reduced.

Figure 5:
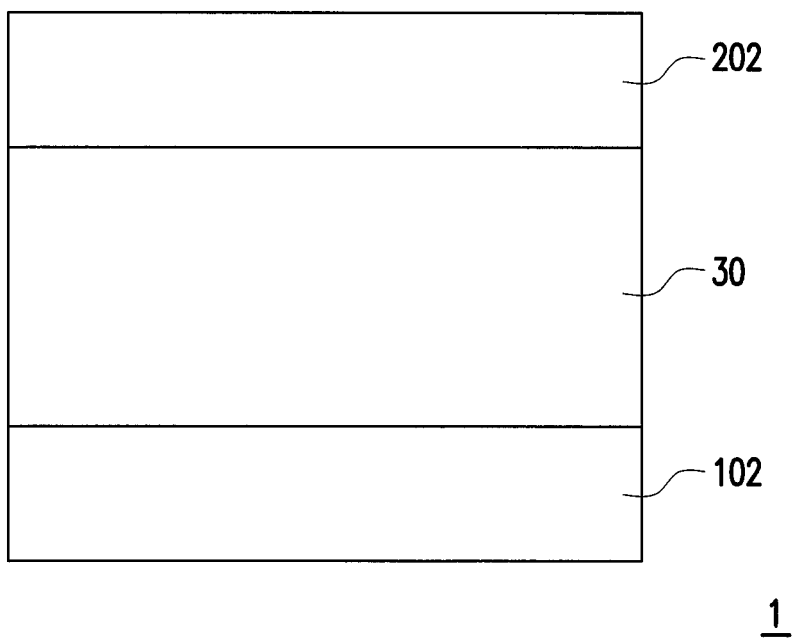
FIG. 5 is a cross-sectional view of an LCD panel according to an embodiment of the invention.

FIG. 5 is a schematic cross-sectional view of a display panel of an embodiment of the invention. Referring to FIG. 1F, FIG. 2F, and FIG. 5, a display panel 1 at least includes a first substrate 102, a second substrate 202, and a display medium layer 30. The display medium layer 30 is, for instance, a liquid crystal layer, an electrophoretic material layer, an electrowetting material layer, but is not limited thereto. In particular, the second substrate 202 is disposed opposite to the first substrate 102 and the display medium layer 30 is disposed between the first substrate 102 and the second substrate 202. Specifically, a plurality of pixel structures 100 can be disposed on the first substrate 102 to form a pixel array substrate, and the pixel structures 100 are located between the first substrate 102 and the display medium layer 30. In particular, structural designs related to the pixel structures 100 are as shown in FIG. 1F and FIG. 2F. A plurality of color filter pattern layers can be, for instance, disposed on the second substrate 202 to form a color filter substrate. Liquid crystal molecules in the display medium layer 30 are, for instance, driven by a lateral electric field generated by the pixel structures 100 in the pixel array substrate. Other detailed structures of the display panel are known to those having ordinary skill in the art and are not repeated herein.

Based on the above, in the pixel structure of the invention, a first extending portion of a common electrode is disposed between a data line and a pixel electrode to be used as an electrical shielding layer between the data line and the pixel electrode. As a result, cross talk phenomenon between the data line and the pixel electrode is reduced, and no additional manufacturing costs are needed. Accordingly, a display panel including the pixel structure can have good display quality.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A pixel structure disposed on a first substrate, comprising:
a scan line disposed on the first substrate;
a first insulation layer disposed on the first substrate and covering the scan line;
a data line disposed on the first insulation layer;
a pixel electrode disposed on the first insulation layer, wherein the pixel electrode and the data line are separated by a distance;
a second insulation layer covering the data line and the pixel electrode, wherein the second insulation layer has a first opening located between the data line and the pixel electrode; and
a common electrode disposed on the second insulation layer and having a plurality of slits exposing a portion of the pixel electrode, wherein the common electrode covers the data line and has a first extending portion extending to fill the first opening such that the first extending portion of the common electrode is located between data line and the pixel electrode.

2. The pixel structure of claim 1, wherein the data line and the pixel electrode are located on a same level.

3. The pixel structure of claim 1, further comprising an active device disposed on the first substrate, wherein the active device comprises a gate electrode, a source electrode, a drain electrode, and a channel layer, the first insulation layer covers the gate electrode, the source electrode and the drain electrode are disposed on the first insulation layer, the gate electrode is electrically connected to the scan line, the source electrode is electrically connected to the data line, and the drain electrode contacts with the pixel electrode.

4. The pixel structure of claim 1, wherein the first extending portion of the common electrode located in the first opening contacts with the first insulation layer.

5. The pixel structure of claim 1, wherein the first insulation layer further comprises a second opening located between the data line and the pixel electrode, the second opening is connected to the first opening to expose a portion of the first substrate, and the common electrode further has a second extending portion extending to fill the second opening such that the second extending portion of the common electrode is located between the data line and the pixel electrode.

6. The pixel structure of claim 5, wherein the common electrode located in the first opening and the second opening contacts with the first substrate.

7. The pixel structure of claim 1, wherein the common electrode comprises a first portion, a second portion, and a plurality of third portions, the first portion covers the scan line, the second portion covers the data line and extends to fill the first opening, and the third portions are located above the pixel electrode, wherein the slits are located among the third portions and between the second portion and the third portions.

8. A manufacturing method of a pixel structure, comprising:
    forming a scan line on a first substrate;
    forming a first insulation layer on the first substrate, wherein the first insulation layer covers the scan line;
    forming a data line on the first insulation layer;
    forming a pixel electrode on the first insulation layer, wherein the pixel electrode and the data line are separated by a distance;
    forming a second insulation layer on the first substrate, wherein the second insulation layer covers the data line and the pixel electrode and has a first opening located between the data line and the pixel electrode; and
    forming a common electrode on the second insulating layer, wherein the common electrode has a plurality of slits, and a portion of the common electrode covers the data line and extends to fill the first opening such that the portion of the common electrode is located between the data line and the pixel electrode.

9. The method of claim 8, wherein the data line and the pixel electrode are located on a same level.

10. The method of claim 8, further comprising forming an active device on the first substrate, wherein the active device comprises a gate electrode, a source electrode, a drain electrode, and a channel layer, the first insulation layer covers the gate electrode, the source electrode and the drain electrode are disposed on the first insulation layer, the gate electrode is electrically connected to the scan line, the source electrode is electrically connected to the data line, and the drain electrode is in direct contact with the pixel electrode.

11. The method of claim 8, wherein the common electrode located in the first opening contacts with the first insulation layer.

12. The method of claim 8, wherein the first insulation layer further comprises a second opening located between the data line and the pixel electrode, the second opening is connected to the first opening to expose a portion of the first substrate, and the portion of the common electrode is further extended to fill the second opening such that the portion of the common electrode is located between the data line and the pixel electrode.

13. The method of claim 12, wherein the common electrode located in the first opening and the second opening contacts with the first substrate.

14. The method of claim 8, wherein the common electrode comprises a first portion, a second portion, and a plurality of third portions, the first portion covers the scan line, the second portion covers the data line and is extended to fill the first opening, and the third portions are located above the pixel electrode, wherein the slits are located among the third portions and between the second portion and the third portions.

15. A display panel, comprising:
    a first substrate;
    a scan line disposed on the first substrate;
    a first insulation layer disposed on the first substrate;
    a data line disposed on the first insulation layer;
    a pixel electrode disposed on the first insulation layer, wherein the pixel electrode and the data line are separated by a distance;
    a second insulation layer covering the data line and the pixel electrode, wherein the second insulation layer has a first opening located between the data line and the pixel electrode; and
    a common electrode disposed on the second insulation layer and having a plurality of slits exposing a portion of the pixel electrode, wherein the common electrode covers the data line and has a first extending portion extending to fill the first opening such that the first extending portion of the common electrode is located between data line and the pixel electrode;
    a second substrate disposed opposite to the first substrate; and
    a display medium layer disposed between the first substrate and the second substrate.

* * * * *